United States Patent
Matsumoto et al.

(10) Patent No.: US 10,412,337 B2
(45) Date of Patent: Sep. 10, 2019

(54) DISPLAY DEVICE

(71) Applicant: Funai Electric Co., Ltd., Daito, Osaka (JP)

(72) Inventors: Masanori Matsumoto, Osaka (JP); Ikuo Kamikubo, Osaka (JP); Hiroshi Nishigaki, Osaka (JP); Yuji Imada, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 125 days.

(21) Appl. No.: 15/600,883

(22) Filed: May 22, 2017

(65) Prior Publication Data

US 2017/0339367 A1 Nov. 23, 2017

(30) Foreign Application Priority Data

May 23, 2016 (JP) .................................. 2016-102356
Mar. 29, 2017 (JP) ................................... 2017-66112

(51) Int. Cl.
*H04N 5/60* (2006.01)
*H04H 40/18* (2008.01)
(Continued)

(52) U.S. Cl.
CPC ............. *H04N 5/60* (2013.01); *G09B 21/006* (2013.01); *H04H 40/18* (2013.01); *H04N 21/4394* (2013.01); *H04N 21/4852* (2013.01)

(58) Field of Classification Search
CPC .. H04N 5/60; H04N 21/4394; H04N 21/4852; G09B 21/006; H04H 40/18

USPC ....... 348/738, 739, 736, 734, 729, 725, 723, 348/719, 714, 707, 706, 558, 515, 231.4; 381/28, 55, 56, 58, 59, 61, 77, 92, 95,
(Continued)

(56) References Cited

U.S. PATENT DOCUMENTS 6,188,439 B1 * 2/2001 Kim .......................... H04N 5/60
348/478
6,263,502 B1 * 7/2001 Morrison ................... H04N 5/44
348/563
(Continued)

FOREIGN PATENT DOCUMENTS

JP 2000-161977 A 6/2000
JP 2008-170980 A 7/2008

OTHER PUBLICATIONS

Extended European Search Report of the corresponding European Application No. 17172189.7, dated Nov. 10, 2017.
(Continued)

*Primary Examiner* — Brian P Yenke
(74) *Attorney, Agent, or Firm* — Global IP Counselors, LLP

(57) ABSTRACT

A display device comprises a display component, an output component, a setting component, and a controller. The output component outputs a first signal having guidance information and a second signal having audio information pertaining to content. The setting component performs volume setting. The controller controls output levels of the first signal and the second signal. The controller sets the output level of the first signal to a value that is greater than or equal to the output level of the second signal, and sets the output level of the first signal to a value greater than zero when the output level of the second signal is zero.

18 Claims, 8 Drawing Sheets

(51) Int. Cl.
*H04N 21/439* (2011.01)
*H04N 21/485* (2011.01)
*G09B 21/00* (2006.01)

(58) Field of Classification Search
USPC .... 381/104, 111, 120, 332; 725/37, 32, 139, 725/151; 715/716, 727, 728, 738
See application file for complete search history.

(56) References Cited

U.S. PATENT DOCUMENTS

| | | | | |
|---|---|---|---|---|
| 6,590,618 B1* | 7/2003 | Park | H04N 5/44513 | 340/12.54 |
| 7,599,503 B2* | 10/2009 | Taniguchi | H03G 3/04 | 348/738 |
| 8,400,434 B2* | 3/2013 | Oka | G10H 1/46 | 345/156 |
| 8,816,813 B2* | 8/2014 | Tondering | H04B 1/202 | 340/12.22 |
| 9,154,848 B2* | 10/2015 | Ouchi | H04N 5/4403 | |
| 9,490,763 B2* | 11/2016 | Taniguchi | H03G 3/20 | |
| 9,529,565 B2* | 12/2016 | Bae | H04N 21/42225 | |
| 9,780,750 B2* | 10/2017 | Ito | H04N 5/60 | |
| 9,990,171 B2* | 6/2018 | Yang | H04N 5/60 | |
| 2004/0196405 A1* | 10/2004 | Spinelli | H04N 5/45 | 348/565 |
| 2005/0117758 A1* | 6/2005 | Wakabayashi | H03G 7/007 | 381/104 |
| 2006/0072769 A1* | 4/2006 | Taniguchi | H03G 3/04 | 381/104 |
| 2006/0287851 A1 | 12/2006 | Kida et al. | | |
| 2007/0104341 A1* | 5/2007 | Kondo | H04R 3/12 | 381/306 |
| 2008/0215240 A1* | 9/2008 | Howard | G01C 21/36 | 701/469 |
| 2008/0301752 A1* | 12/2008 | Jung | H04H 20/08 | 725/151 |
| 2008/0303947 A1* | 12/2008 | Ohnishi | H04N 5/60 | 348/558 |
| 2010/0124885 A1* | 5/2010 | Sasse | G01C 21/3629 | 455/41.3 |
| 2010/0211875 A1* | 8/2010 | Matsushita | G06F 3/0482 | 715/716 |
| 2010/0280749 A1* | 11/2010 | Furumoto | G01C 21/3629 | 701/533 |
| 2011/0103605 A1* | 5/2011 | Killion | A61F 11/08 | 381/72 |
| 2012/0042249 A1* | 2/2012 | Chung | H04R 5/02 | 715/716 |
| 2012/0144299 A1* | 6/2012 | Patel | G06F 3/0488 | 715/702 |
| 2012/0173238 A1* | 7/2012 | Mickelsen | G10L 15/30 | 704/246 |
| 2012/0180093 A1* | 7/2012 | Ishihara | H04N 5/607 | 725/80 |
| 2012/0224719 A1* | 9/2012 | Johansson | G08B 7/06 | 381/98 |
| 2013/0148825 A1* | 6/2013 | Fukuma | H03G 3/20 | 381/107 |
| 2013/0155177 A1* | 6/2013 | Mock | H04N 21/42204 | 348/14.08 |
| 2013/0201115 A1* | 8/2013 | Heubel | G06F 3/0487 | 345/173 |
| 2013/0259265 A1* | 10/2013 | Taniguchi | H03G 3/20 | 381/107 |
| 2013/0287215 A1* | 10/2013 | Kim | H04M 1/6016 | 381/57 |
| 2014/0160362 A1* | 6/2014 | Shintani | H04N 21/4122 | 348/738 |
| 2014/0177856 A1* | 6/2014 | Sudo | H04R 3/002 | 381/66 |
| 2015/0043752 A1* | 2/2015 | Ito | H04N 5/60 | 381/107 |
| 2015/0074703 A1* | 3/2015 | Cremer | H04N 21/44222 | 725/19 |
| 2015/0248890 A1* | 9/2015 | Whitecar | H04H 60/12 | 704/500 |
| 2015/0378592 A1* | 12/2015 | Kim | G06F 1/1628 | 715/765 |
| 2019/0109573 A1* | 4/2019 | Son | H03G 5/025 | |

OTHER PUBLICATIONS

The European search report for the corresponding European application No. 19151248.2, dated Apr. 5, 2019.

* cited by examiner

SECOND EMBODIMENT

OUTPUT VOLUME VALUE TABLE T2

| VOLUME SETTING VALUE | NON-GUIDANCE AUDIO OUTPUT VOLUME VALUE | GUIDANCE AUDIO OUTPUT VOLUME VALUE |
|---|---|---|
| 0 | 0 | 20 |
| 1 | 1 | 21 |
| 2 | 2 | 22 |
| 3 | 3 | 23 |
| 4 | 4 | 24 |
| ... | ... | ... |
| 96 | 96 | 100 |
| 97 | 97 | 100 |
| 98 | 98 | 100 |
| 99 | 99 | 100 |
| 100 | 100 | 100 |

DISPLAY DEVICE

CROSS-REFERENCE TO RELATED APPLICATIONS

This application claims priority to Japanese Patent Application Nos. 2016-102356 filed on May 23, 2016 and 2017-66112 filed on Mar. 29, 2017. The entire disclosures of Japanese Patent Application Nos. 2016-102356 and 2017-66112 are hereby incorporated herein by reference.

BACKGROUND

Field of the Invention

The present invention generally relates to a display device. More specifically, the present invention relates to a display device including an output component that is configured to output a first signal having guidance information and a second signal having audio information related to video.

Background Information

A guidance device capable of outputting a first signal having guidance information and a second signal having audio information related to video is known in the art (see Japanese Laid-Open Patent Application Publication No. 2008-170980 (Patent Literature 1), for example).

With the above-mentioned Patent Literature 1, the guidance device includes a display component, an output component, and a controller. The output component outputs guidance audio and non-guidance audio other than the guidance audio. The controller performs control to output the guidance audio at a volume output value corresponding to a volume output value of the non-guidance audio. This guidance device is configured such that the volume output value of the guidance audio is determined based on the volume setting value of the guidance device.

SUMMARY

However, when the volume setting value of the guidance device is set to 0 (zero; a muted state), then not only the volume output value of the non-guidance audio, but the volume output value of the guidance audio can also end up being set to 0 (zero). Therefore, when the volume setting value of the guidance device is set to 0 (zero), no guidance audio (guidance information) is issued (outputted). This is a problem in that a visually impaired user cannot be apprised of the content of the guidance audio (guidance information).

One object is to provide a display device with which a visually impaired user can be reliably apprised of the content of guidance information even when the volume setting value of the display device has been set to 0 (zero; a muted state).

In view of the state of the known technology and in accordance with a first aspect of the present invention, a display device comprises a display component, an output component, a setting component, and a controller. The output component outputs a first signal having guidance information and a second signal having audio information pertaining to content. The setting component performs volume setting. The controller controls output levels of the first signal and the second signal. The controller sets the output level of the first signal to a value that is greater than or equal to the output level of the second signal, and sets the output level of the first signal to a value greater than zero when the output level of the second signal is zero.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Overall Configuration of Display Device

First, the configuration of a display device 100 pertaining to a first embodiment will be described through reference to FIGS. 1 and 2.

Figure 1:
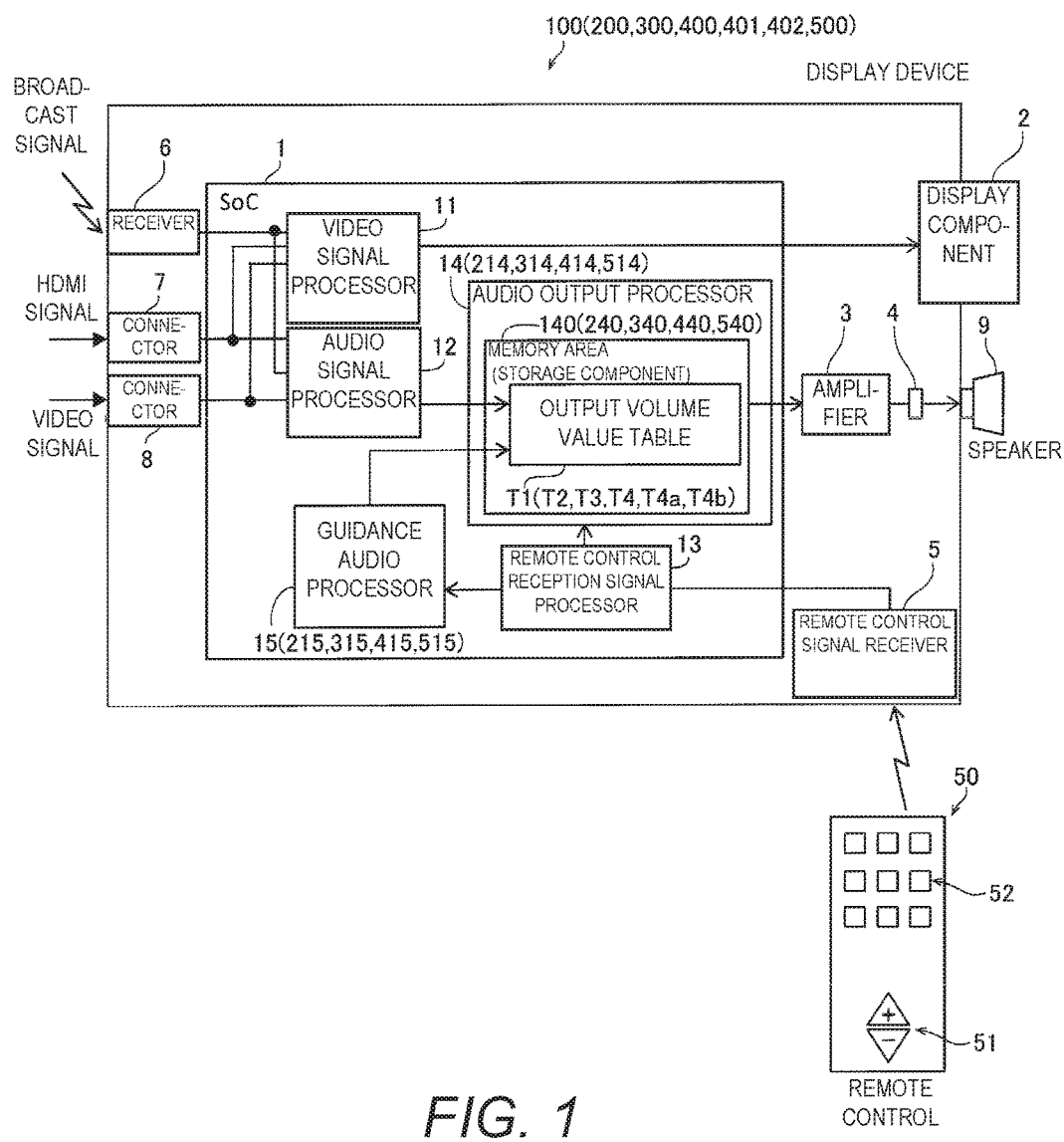
FIG. 1 is a block diagram of a display device pertaining to a first embodiment.

As shown in FIG. 1, the display device 100 is a television set or other display device that can be operated with a remote control 50. A setting component 51 (volume buttons) on the remote control 50 allows the volume setting value to be changed for the display device 100. Various setting components 52 (buttons) on the remote control 50 can be used for various operations (such as changing the channel) on the display device 100. The display device 100 can output "guidance audio" or other such audio. The guidance audio or other such audio conveys or notifies information related to operations performed on the display device 100 using the remote control 50, or information related to the status of the display device 100. Also, the display device 100 can output "non-guidance audio" that is different from the guidance audio. In the first embodiment, the non-guidance audio is, for example, audio related to video that is displayed on a display component 2 of the display device 100. However, the non-guidance audio is not limited to this. The non-guidance audio can be audio related to content other than the video. The guidance audio and the non-guidance audio are examples, respectively, of the "first signal having guidance information" and the "second signal having audio information related to video" of the present disclosure. In other words, the non-guidance audio is the audio of the displayed video program. The guidance audio is other than this non-guidance audio.

The display device 100 includes an SoC (system on chip) 1. The SoC 1 controls the entire display device 100. The SoC 1 will be discussed in detail below. Also, the display device 100 includes the display component 2, which displays video. The display component 2 is, for example, a liquid crystal display (LCD) in the illustrated embodiment. However, the display component 2 can be different type of display. The display device 100 includes an amplifier 3 that amplifies audio signals.

Also, the display device 100 includes an output component 4 that outputs audio signals amplified by the amplifier 3. The output component 4 is disposed between the amplifier 3 and a speaker 9. The output component 4 outputs the guidance audio and the non-guidance audio. The display device 100 outputs the guidance audio and the non-guidance audio at output volume values corresponding to a volume setting value set with the setting component 51 of the remote control 50. The output volume values are an example of the "output level" of the present disclosure.

The display device 100 also includes a remote control signal receiver 5. The remote control signal receiver 5 receives signals (remote control signals) issuing from the remote control 50. The display device 100 also comprises a receiver (tuner) 6 that receives broadcast signals. The display device 100 also comprises a connector 7. The connector 7 is a terminal that conforms to the HDMI™ (High-Definition Multimedia Interface) standard, for example. This connector 7 receives audio and video signals conforming to the HDMI™ standard and transmitted from an external content reproduction device (not shown) that is connected via the connector 7. Of course, the connector 7 can be different type of connector.

The display device 100 further comprises a connector 8. The connector 8 is a video input terminal, for example. The connector 8 receives video signals transmitted from an external content reproduction device (not shown) that is connected via the connector 8. The term "video signal" includes both audio signals and video signals.

Detailed Configuration of SoC

The SoC 1 includes various kinds of processor (CPU). More specifically, the SoC 1 comprises a video signal processor 11. The video signal processor 11 includes a CPU. The video signal processor 11 has the function of processing video data included in a broadcast signal received by the receiver 6, and outputting the data to the display component 2. The video signal processor 11 also has the function of processing video data of a video signal or video data conforming to the HDMI™ standard and received via the connector 7 or 8, and outputting the data to the display component 2.

The SoC 1 also comprises an audio signal processor 12. The audio signal processor 12 includes a CPU. The audio signal processor 12 has the function of processing audio data included in a broadcast signal received by the receiver 6, and outputting the data to an audio output processor 14. The audio signal processor 12 also has the function of processing audio data of a video signal or audio data conforming to the HDMI™ standard and received via the connector 7 or 8, and outputting the data to the audio output processor 14. The SoC 1 also comprises a remote control reception signal processor 13. The remote control reception signal processor 13 includes a CPU, and has the function of processing signals from the remote control 50 received by the remote control signal receiver 5.

The SoC 1 also comprises the audio output processor 14. The audio output processor 14 includes a CPU. The audio output processor 14 performs control processing related to audio output. The output component 4 outputs audio signals based on signals processed by the audio output processor 14. The audio output processor 14 also has a memory area (storage component) 140. The memory area 140 stores an output volume value table T1. As shown in FIG. 2, the output volume value table T1 is a table in which output volume values for the non-guidance audio and output volume values for the guidance audio are associated with volume setting values. The graph at the bottom in FIG. 2 is a plot of the numerical values given in the output volume value table T1, with the horizontal axis showing the volume setting value and the vertical axis the output volume value. In the graph in FIG. 2, the solid line indicates the output volume value of the guidance audio versus the volume setting value, while the broken line indicates the output volume value of the non-guidance audio versus the volume setting value. The output volume value table T1 is an example of the "table" of the present disclosure.

The audio output processor 14 outputs the non-guidance audio processed by the audio signal processor 12 and the guidance audio produced by a guidance audio processor 15 (discussed below), based on the output volume value table T1. As shown in FIG. 1, the SoC 1 also comprises the guidance audio processor 15. The guidance audio processor 15 produces guidance audio. The audio output processor 14 is an example of the "controller" of the present disclosure.

Figure 2:
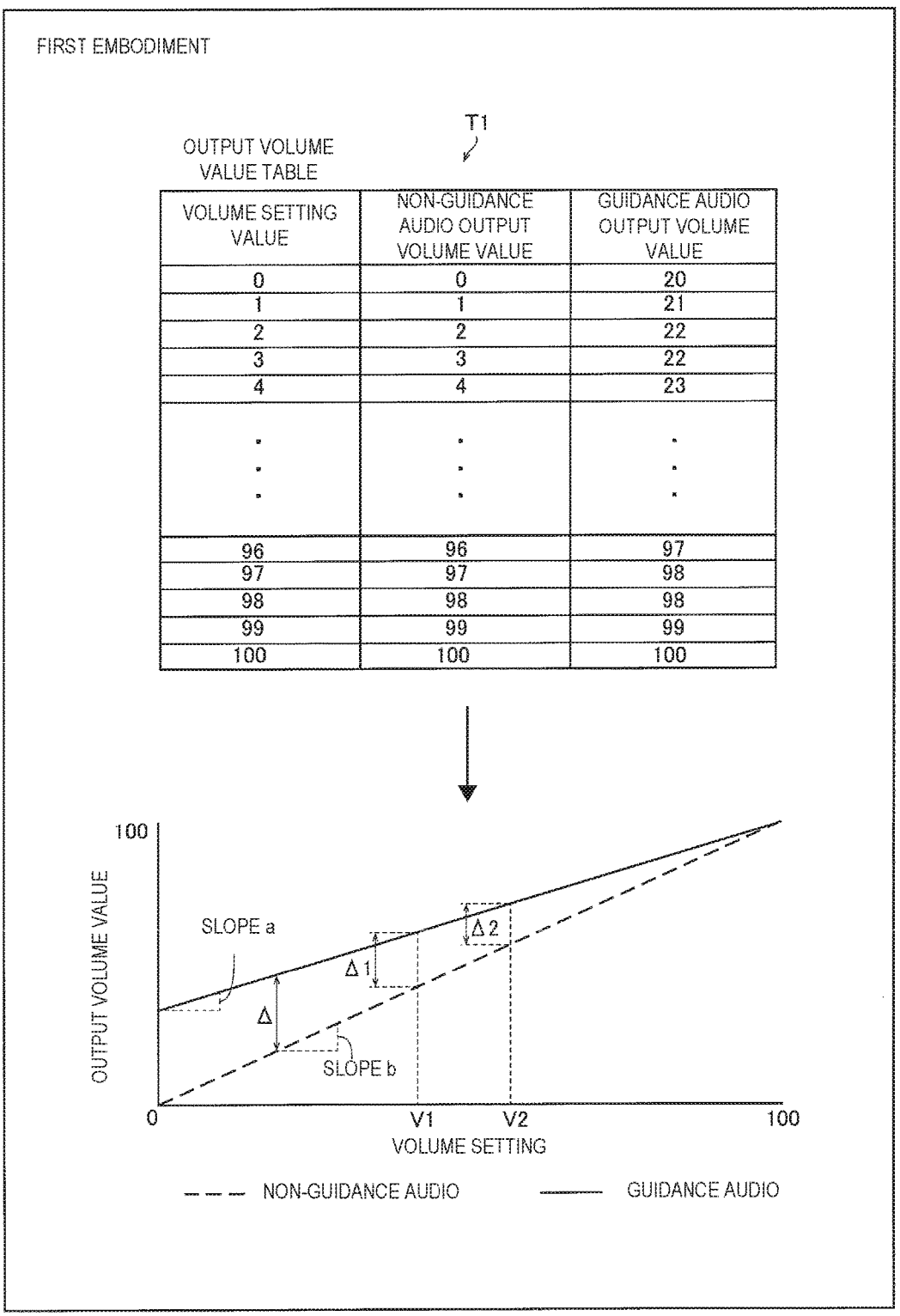
FIG. 2 is a table of correlation between a volume setting value and output volume values for guidance audio and non-guidance audio in the display device pertaining to the first embodiment.

As shown in FIG. 2, in the first embodiment, the audio output processor 14 (see FIG. 1) performs control so that when the output volume value of the non-guidance audio has been set to "0 (a muted state)" (hereinafter referred to as a 0 level) by setting the volume setting value to 0 level by the setting component 51 of the remote control 50 (see FIG. 1), the guidance audio is outputted from the output component 4 at an output volume value that is greater than this 0 level. In this case, the audio output processor 14 performs control to output the guidance audio at an output volume value (e.g., the 20 level in this embodiment) that is greater than the 0 level (a muted state) based on the output volume value table T1. In the output volume value table T1, the output volume values of the non-guidance audio and the output volume values of the guidance audio are associated with the volume setting values. The audio output processor 14 performs audio output control that makes use of the output volume value table T1 in which the output volume value of guidance audio will not go to the 0 level for each of the volume setting values. Also, the configuration is such that as the volume setting value increases, the output volume value of the guidance audio is also increased. Therefore, a visually impaired user is able to listen to the non-guidance audio while easily hearing the guidance audio as well.

Also, in the first embodiment, the audio output processor 14 performs control in which the volume of the guidance audio is set to be greater than or equal to the volume of the non-guidance audio when the volume of the non-guidance audio is not at the 0 level. More precisely, in the range between the 0 level (the minimum level) and 99 over which the volume setting value and the output volume value of the non-guidance audio can be varied, the guidance audio is outputted at an output volume value that is greater than the 0 level. Also, at the 100 level (the maximum level), which is the upper limit to the volume setting value and the output volume value of the non-guidance audio, the volume of the non-guidance audio and the volume of the guidance audio are substantially the same. Specifically, the audio output processor 14 performs control so that when the guidance audio is outputted, it will always be outputted at an output volume value that is greater than the 0 level. Therefore, it is stipulated ahead of time in the output volume value table T1 that the audio output processor 14 performs audio output control such that the output volume value of the guidance audio will be greater than the output volume value of the non-guidance audio when the volume setting value is between the 0 level (minimum level) and 99, and that the output volume value of the guidance audio will be equal to the output volume value of the non-guidance audio when the volume setting value is 100 (maximum value).

Also, in the first embodiment, the difference between the output volume values for the guidance audio at a specific volume setting value and a volume setting value that is different from this specific volume setting value, is less than the difference between the output volume values for the non-guidance audio at the specific volume setting value and the volume setting value that is different from this specific volume setting value. More specifically, the output volume value table T1 is configured such that, in the graph in FIG. 2, the output volume value for the guidance audio and the output volume value for the non-guidance audio increase (decrease) substantially linearly as the volume setting value (horizontal axis) increases (decreases). Also, the differential between the output volume value of the guidance audio at a volume setting value V1 and the output volume value of the guidance audio at a volume setting value V2 that is greater than this volume setting value V1 (the slope a of the linear plot (waveform) indicated by the solid line between the volume setting values V1 and V2; the rate of change (change rate) a) is less than the differential in the output volume value of the non-guidance audio in the same change from the volume setting value V1 to V2 (the slope b of the linear plot (waveform) indicated by the broken line between the volume setting values V1 and V2; the rate of change (change rate) b) (a<b). In other words, the rate of change a in the output volume value of the guidance audio to the volume setting value is less than the rate of change b in the output volume value of the non-guidance audio to the volume setting value. Therefore, the increase (or decrease) in the output volume value of the guidance audio is kept lower than the increase (or decrease) in the output volume value of the non-guidance audio during an increase (or decrease) in the volume setting value. The plot indicated by the solid line in FIG. 2 is a waveform indicating the characteristics of the volume setting value and the output volume value of the guidance audio, while the plot indicated by the broken line in FIG. 2 is a waveform indicating the characteristics of the volume setting value and the output volume value of the non-guidance audio.

Also, the difference between the output volume value of the guidance audio and the output volume value of the non-guidance audio at a specific volume setting value is greater than the difference between the output volume value of the guidance audio and the output volume value of the non-guidance audio at a volume setting value that is greater than this specific volume setting value. More specifically, in the graph in FIG. 2, the volume difference 47 between the output volume value of the guidance audio and the output volume value of the non-guidance audio at the volume setting value V2 is less than the volume difference Δ1 between the output volume value of the guidance audio and the output volume value of the non-guidance audio at the volume setting value V1. In other words, as the volume setting value increases, the volume difference Δ decreases from the volume difference Δ1 to the volume difference Δ2. Conversely, as the volume setting value decreases, the volume difference Δ increases from the volume difference Δ2 to the volume difference Δ1. Specifically, the audio output processor 14 uses the output volume value table T1 to perform volume output control set such that, over the entire range over which the volume setting value can be varied (from the 0 level to 100), as the volume setting value increases, the difference between the output volume value of the guidance audio and the output volume value of the non-guidance audio (the volume difference Δ) will decrease. In this case, the audio output processor 14 performs control to set (vary) both the output volume value of the non-guidance audio and the output volume value of the guidance audio so that the output volume value of the guidance audio increases by a specific volume difference Δ relative to the output volume value of the non-guidance audio as the volume setting value is varied. Consequently, the increase (or decrease) in the output volume value of the guidance audio is kept lower than the increase (or decrease) in the output volume value of the non-guidance audio during an increase (or decrease) in the volume setting value.

The audio output processor 14 performs control to output the guidance audio at an output volume value that is greater than the 0 level over the entire range over which the volume setting value can be varied (from the 0 level to 100). Also, the audio output processor 14 performs control to set both the output volume value of the non-guidance audio and the output volume value of the guidance audio as the volume setting value is varied. Also, over the entire range over which the volume setting value can be varied (from the 0 level to 100), the guidance audio linearly changes with respect to changes in the volume setting value (the graph in FIG. 2 changes linearly). The display device 100 in the first embodiment is configured as above.

Effect of First Embodiment

The following effect can be obtained with the first embodiment.

As discussed above, with the first embodiment, the audio output processor 14 is provided to set the output volume value (output level) of the guidance audio having the guidance information to a value that is greater than or equal to the output volume value (output level) of the non-guidance audio having the audio information related to video, and to set the output volume value (output level) of the guidance audio to a value that is greater than zero when the output volume value (output level) of the non-guidance audio is at the 0 level (a muted state). Consequently, even when the volume setting value of the display device 100 has been set to the 0 level, the guidance audio can be outputted at an output volume value that is greater than the 0 level. Also, even when the output volume value of the non-guidance audio is a value other than the 0 level, the output volume value of the guidance audio will be a value greater than or equal to the output volume value of the non-guidance audio. Thus, the guidance audio can be outputted in addition to the non-guidance audio. As a result of all this, even when the volume setting value of the display device 100 has been set to the 0 level (a muted state), a visually impaired user can be reliably apprised of the content of the guidance audio.

Also, with the first embodiment, the change amount in the output volume value of the guidance audio due to a specific change in the volume setting value (such as a change from V1 to V2) will be a value less than or equal to the change amount in the output volume value of the non-guidance audio due to the specific change. Consequently, the increase (or decrease) in the output volume value of the guidance audio due to the increase (or decrease) in the volume setting value can be kept lower than the increase (or decrease) in the output volume value of the non-guidance audio due to the increase (or decrease) in the volume setting value. Thus, a sudden change in the output volume value of the guidance audio due to the increase (or decrease) in the volume setting value is avoided. Therefore, a visually impaired user will be able to hear the guidance audio to the extent that simultaneously hearing audio related to video (the non-guidance audio) will not be hindered.

Also, in the first embodiment, the rate of change a in the output volume value of the guidance audio with respect to a change in the volume setting value (the horizontal axis in the graph in FIG. 2) (the slope a of the plot (waveform) indicated by the solid line between the volume setting values V1 and V2) and the rate of change b in the output volume value of the non-guidance audio (the slope b of the plot (waveform) indicated by the broken line between the volume setting values V1 and V2) are in a relation of a<b. Consequently, because the slope a is less than the slope b, the increase (or decrease) in the output volume value of the guidance audio due to the increase (or decrease) in the volume setting value can be reliably kept lower than the increase (or decrease) in the output volume value of the non-guidance audio due to the increase (or decrease) in the volume setting value. Therefore, regardless of the increase (or decrease) in the volume setting value, a visually impaired user will reliably be able to hear the guidance information to the extent that hearing the audio information related to video will not be hindered.

Also, in the first embodiment, the volume difference $\Delta 1$ between the output volume value of the guidance audio and the output volume value of the non-guidance audio at the volume setting value V1 is greater than the volume difference $\Delta 2$ between the output volume value of the guidance audio and the output volume value of the non-guidance audio at the volume setting value V2, which is greater than the volume setting value V1. Consequently, as the volume setting value increases, the volume difference $\Delta$ between the output volume value of the guidance audio and the output volume value of the non-guidance audio shrinks from the volume difference $\Delta 1$ to the volume difference $\Delta 2$. Thus, it is less likely that the output volume value of the guidance information will be too high. Also, the guidance information can be outputted at an output volume value that is suitable for a visually impaired user.

Also, in the first embodiment, the output volume value table T1 is provided in which output volume values (output levels) of the guidance audio and the non-guidance audio are associated with volume setting values corresponding to the volume setting of the setting component 51. The audio output processor 14 controls the output volume values (output levels) of the guidance audio and the non-guidance audio based on the output volume value table T1. Consequently, even if the output volume value of the non-guidance audio has been set to the 0 level in the display device 100, as opposed to a situation in which computation is performed each time so that the output volume value of the guidance audio will not be at the 0 level, by using the output volume value table T1, it can be quickly prevented that the output volume value of the guidance audio will be at the 0 level, and that computation will impose an extra load on the audio output processor 14. Also, even if the output volume value of the non-guidance audio in the display device 100 is set to something other than the 0 level, the output volume value table T1 can be used to quickly keep the output volume value of the guidance audio at or above the output volume value of the non-guidance audio.

Also, in the first embodiment, the audio output processor 14 performs control to change the output volume values (output levels) of both the guidance audio and the non-guidance audio as the volume setting value changes. Consequently, both the guidance audio and the non-guidance audio can be changed to an output volume value that suits the usage situation, in conjunction with the volume setting value.

Also, in the first embodiment, the guidance audio is audio that conveys information related to an operation carried out on the display device 100, and information related to the status of the display device 100. Consequently, the information related to operations performed on the display device 100, and the information related to the status of the display device 100 can be conveyed to a visually impaired user.

Also, in the first embodiment, the non-guidance audio is audio related to video displayed on the display component 2. Consequently, the guidance audio can be outputted even with a setting such that audio related to video displayed on the display component 2 is at the 0 level (a muted state).

Also, in the first embodiment, the receiver 6 that receives broadcast signals is provided, and the non-guidance audio corresponds to audio from the receiver 6. Consequently, the guidance audio can be easily outputted so that the user can see and hear it, even when the volume setting value at which the audio included in the broadcast signal (the non-guidance audio) is outputted has been set to the 0 level (a muted state).

Also, in the first embodiment, the connector 7 (e.g., the input unit) is provided for connecting to a content reproduction device (e.g., an external device), and the non-guidance audio corresponds to audio inputted from the connector 7. Consequently, even if the volume setting value at which audio included in content from the content reproduction device (the non-guidance audio) is outputted has been set to the 0 level (a muted state), the guidance audio can still be easily outputted so that the user can see and hear it.

Also, in the first embodiment, the audio output processor 14 performs control to set both the output volume value of the non-guidance audio and the output volume value of the guidance audio so that as the volume setting value is changed, the output volume value of the guidance audio becomes greater by a specific volume difference $\Delta$ than the output volume value of the non-guidance audio. Consequently, even if the volume setting value is changed, the guidance audio can be outputted at an output volume value that is greater by the specific volume difference than the output volume value of the non-guidance audio. Thus, the guidance audio can be easily heard.

Also, in the first embodiment, the memory area (storage component) 140 is provided to store the output volume value table T1. Consequently, the output volume value table T1 stored in the memory area (storage component) 140 can be used to quickly perform control so that the output volume value of the guidance audio does not go to the 0 level (a muted state).

In the illustrated embodiment, the display device 100 comprises the display component 2, the output component 4, the setting component 51, and the audio output processor 14. The output component 4 outputs the guidance audio having the guidance information and the non-guidance audio having the information related to video. The setting component 51 performs the volume setting. The audio output processor 14 controls the output levels of the guidance audio and the non-guidance audio. The audio output processor 14 sets the output level of the guidance audio to a value that is greater than or equal to the output level of the non-guidance audio, and sets the output level of the guidance audio to a value greater than zero when the output level of the non-guidance audio is zero.

Second Embodiment

Figure 3:
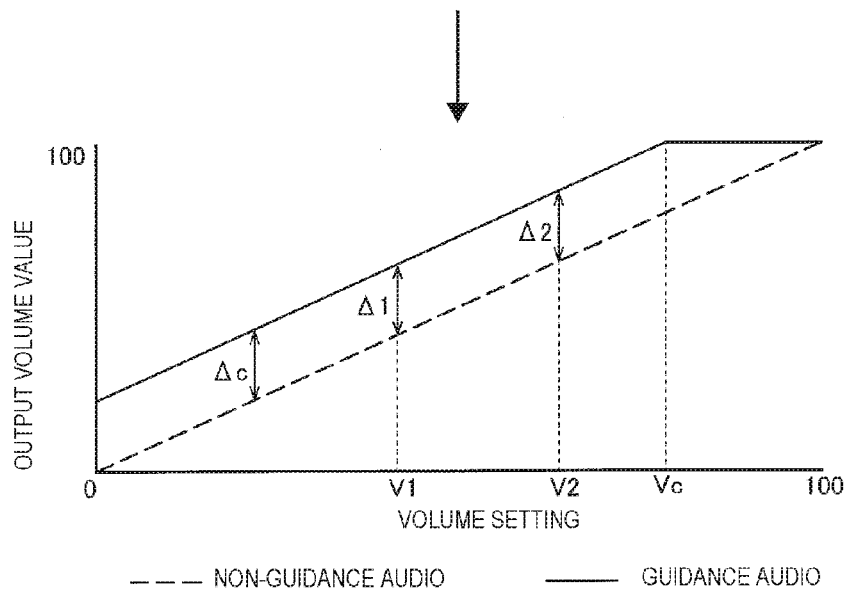
FIG. 3 is a table of correlation between a volume setting value and output volume values for guidance audio and non-guidance audio in a display device pertaining to a second embodiment.

The configuration of a display device 200 pertaining to a second embodiment will now be described through reference to FIGS. 1 and 3. In the first embodiment, the volume difference Δ between the output volume value of the guidance audio and the output volume value of the non-guidance audio decreases as the volume setting value increases over the entire range over which the volume setting value can be varied. On the other hand, in this second embodiment, the volume difference Δ between the output volume value of the guidance audio and the output volume value of the non-guidance audio is decreased as the volume setting value increases over part of the range over which the volume setting value can be varied. Except for a difference in the output volume value table, the device configuration in the second embodiment is substantially the same as the device configuration in the first embodiment above. The output volume value table T2 is also an example of the "table" of the present disclosure.

As shown in FIG. 1, the output volume value table T2 is stored in a memory area (storage component) 240 of an audio output processor 214. In the second embodiment, the audio output processor 214 performs control to output the guidance audio at an output volume value that is greater than the 0 level, based on the output volume value table T2. That is, as shown in FIG. 3, the audio output processor 214 performs audio output control using the output volume value table T2 set so that the output volume value of the guidance audio will not drop to the 0 level. The audio output processor 214 is an example of the "controller" of the present disclosure.

The audio output processor 214 performs control to set the output volume value of the guidance audio so as to produce a rate of change that is less than a rate of change in the output volume value of the non-guidance audio with respect to the volume setting value. Also, the audio output processor 214 performs control to set both the output volume value of the non-guidance audio and the output volume value of the guidance audio so that the output volume value of the guidance audio will be greater by a specific volume difference Δc than the output volume value of the non-guidance audio as the volume setting value is changed. More precisely, the audio output processor 214 performs control to set both the output volume value of the non-guidance audio and the output volume value of the guidance audio so that the output volume value of the guidance audio will be greater by the specific volume difference Δc than the output volume value of the non-guidance audio at a volume setting value that is less than a volume setting value at which the output volume value of the guidance audio is at its maximum (such as the volume setting value Vc) as the volume setting value is changed. In other words, over the range from the 0 level to the volume setting value Vc that is greater than the 0 level, the volume difference Δ1 between the output volume value of the guidance audio and the output volume value of the non-guidance audio at the volume setting value V1 is substantially equal to the volume difference Δ2 between the output volume value of the guidance audio and the output volume value of the non-guidance audio at the volume setting value V2, which is different from this volume setting value V1 (Δ1≈Δ2≈Δc). Over the range from the 0 level to the volume setting value Vc, the output volume value of the guidance audio at the volume setting value V1 (or the volume setting value V2) is different from the output volume value of the non-guidance audio. The 0 level and the volume setting value Vc are respectively examples of the "first volume setting value" and the "second volume setting value" of the present disclosure.

Also, the audio output processor 214 performs control to keep the output volume value of the guidance audio constant (at the 100 level) at a volume setting value that is greater than or equal to the volume setting value (the volume setting value Vc) at which the output volume value of the guidance audio is at its maximum. That is, over the range of the volume setting values greater than the volume setting value Vc, the output volume value of the guidance audio is set to fall within a specific range (constant at the 100 level).

As discussed above, in the second embodiment, the output volume value of the guidance audio changes at the same constant rate (the slope of the plot) as the output volume value of the non-guidance audio over the range from the 0 level to the volume setting value up to the volume setting value Vc. In other words, the rate of change in the output volume value of the guidance audio to the volume setting value is equal to the rate of change in the output volume value of the non-guidance audio to the volume setting value for a specific range of the volume setting value (i.e., for the range from the 0 level to the volume setting value Vc). On the other hand, the rate of change in the output volume value of the guidance audio to the volume setting value is less than the rate of change in the output volume value of the non-guidance audio to the volume setting value for a specific range of the volume setting value (i.e., for the range from the volume setting value Vc to the 100 level).

Also, the output volume value of the guidance audio is constant (at the 100 level) over the range of the volume setting values from the volume setting value Vc and beyond. The rest of the configuration of the second embodiment is the same as in the first embodiment above.

Effect of Second Embodiment

The following effect can be obtained with the second embodiment.

In the second embodiment, the audio output processor 214 is provided so that the output volume value of the guidance audio will be greater than the 0 level when the output volume value of the non-guidance audio is at the 0 level (a muted state), and the output volume value of the guidance audio will be greater than or equal to the output volume value of the non-guidance audio when the output volume value of the non-guidance audio is something other than the 0 level. Consequently, just as in the first embodiment above, even if the volume setting value of the display device 200 has been set to the 0 level (a muted state), the content of the guidance can be reliably conveyed to a visually impaired user by means of the guidance audio at an output volume value that is greater than the 0 level.

Also, in the second embodiment, over a range from the 0 level to the volume setting value Vc, the volume difference Δ1 between the output volume value of the guidance audio and the output volume value of the non-guidance audio at the volume setting value V1 and the volume difference Δ2 between the output volume value of the guidance audio and the output volume value of the non-guidance audio at the volume setting value V2, which is different from the volume setting value V1, are substantially equal values. Consequently, even if the volume setting value is changed, the guidance audio can be outputted at an output volume value that is greater by a specific volume (a volume of a constant value) than the output volume value of the non-guidance audio. Therefore, a visually impaired user can easily hear the guidance audio even if the volume setting value has been changed.

Also, in the second embodiment, the output volume value of the guidance audio is within a specific range (a constant 100 level). Consequently, even if the output volume value of the guidance audio is set to a volume setting value that is greater than the volume setting value Vc, the output volume value of the guidance audio will be maintained at the maximum value or near the maximum value (a constant 100 level). Thus, over a range of volume setting values that are greater than or equal to the volume setting value at which the output volume value of the guidance audio is at its highest, a situation will be avoided in which the guidance audio becomes a hindrance that makes it hard to hear the non-guidance audio.

Also, in the second embodiment, over the range from the 0 level to the volume setting value Vc, the output volume value of the guidance audio at the volume setting value V1 (volume setting value V2) is made to be different from the output volume value of the non-guidance audio. Consequently, even if the volume setting value is changed, the guidance audio can be outputted at an output volume value that is greater by a specific output volume value (volume difference Δc) than the output volume value of the non-guidance audio. Thus, a visually impaired user can easily hear the guidance audio.

Also, in the second embodiment, the audio output processor 214 is configured to perform control to set both the output volume value of the non-guidance audio and the output volume value of the guidance audio so that as the volume setting value is changed, the output volume value of the guidance audio becomes greater by the volume difference Δc than the output volume value of the non-guidance audio. Consequently, even if the volume setting value is changed, the guidance audio can be outputted at an output volume value that is greater by the specific volume difference than the output volume value of the non-guidance audio. The rest of the effect of the second embodiment is the same as in the first embodiment above.

Third Embodiment

Figure 4:
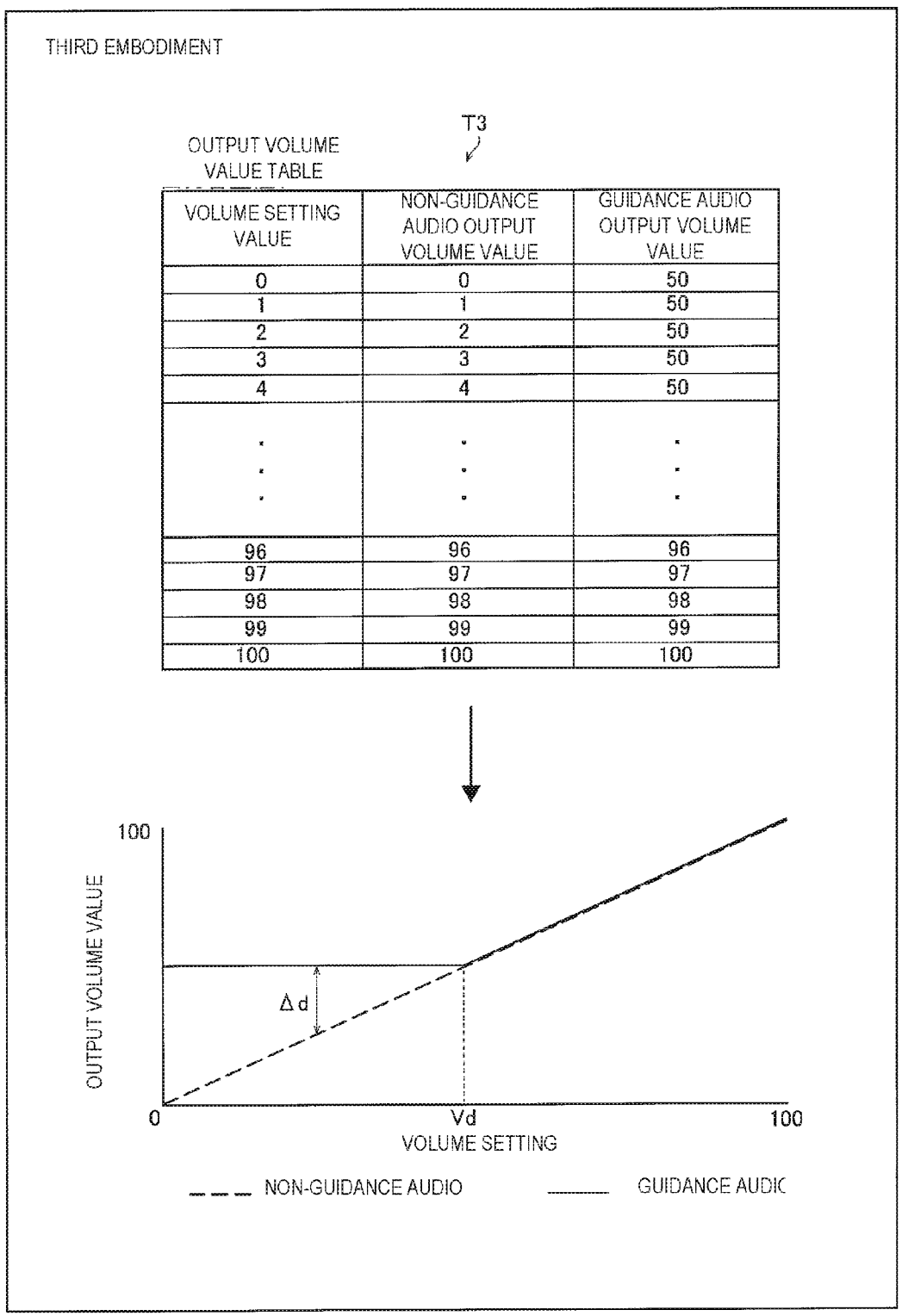
FIG. 4 is a table of correlation between a volume setting value and output volume values for guidance audio and non-guidance audio in a display device pertaining to a third embodiment.

The configuration of a display device 300 pertaining to a third embodiment will now be described through reference to FIGS. 1 and 4. In the first embodiment, the output volume value of the guidance audio increases over the entire range over which the volume setting value can be varied when the volume setting value increases. On the other hand, in this third embodiment, when the volume setting value is increased, the output volume value of the guidance audio is increased over just part of the range over which the volume setting value can be varied. Except for a difference in the output volume value table, the device configuration in the third embodiment is substantially the same as the device configuration in the first embodiment above.

As shown in FIG. 1, an output volume value table T3 is stored in a memory area (storage component) 340 of an audio output processor 314. In the third embodiment, the audio output processor 314 performs control to output the guidance audio at an output volume value that is greater than the 0 level, based on the output volume value table T3. That is, as shown in FIG. 4, the audio output processor 314 performs audio output control using the output volume value table T3 set so that the output volume value of the guidance audio will not drop to the 0 level for each volume setting values. The audio output processor 314 is an example of the "controller" of the present disclosure. The output volume value table T3 is also an example of the "table" of the present disclosure.

In the third embodiment, the audio output processor 314 performs control to keep the output volume value of the guidance audio constant (within a specific range) over the range in which the volume setting value is from the 0 level to a value (volume setting value Vd) that is greater than the 0 level and less than the maximum volume setting value, out of the settable range of the volume setting value. The audio output processor 314 performs control to keep the output volume value of the guidance audio constant (within a specific range) over the range in which the volume setting value is from the 0 level to a value that is less than one half (less than the 50 level) the maximum volume setting value (the 100 level), out of the settable range of the volume setting value. The audio output processor 314 also performs control to make the output volume value of the guidance audio substantially match the output volume value of the non-guidance audio over a range from a value that is at least half the maximum volume setting value (at least the 50 level) to no more than the maximum volume setting value (no more than the 100 level). The volume setting value Vd and the maximum volume setting value (the 100 level) are respectively examples of the "first volume setting value" and the "second volume setting value" of the present disclosure.

More precisely, the audio output processor 314 performs control to set both the output volume value of the non-guidance audio and the output volume value of the guidance audio so that the output volume value of the guidance audio will be greater by a specific volume difference Δd than the output volume value of the non-guidance audio as the volume setting value changes, at a volume setting value that is less than the volume setting value Vd. Also, the audio output processor 314 performs control to keep the output volume value of the guidance audio constant at a volume setting value that is less than the volume setting value Vd. Also, the constant output volume value of the guidance audio is made to substantially match the output volume value of the non-guidance audio at the volume setting value Vd. In the third embodiment, the volume setting value Vd is the "50 level" (the midpoint (half value) of the maximum volume setting value). However, the volume setting value Vd can instead be some other value. Specifically, this volume setting value Vd can be changed to the desired value by the user.

Also, the audio output processor 314 performs control to set the output volume value of the guidance audio and the output volume value of the non-guidance audio at the volume setting value Vd to substantially equal values over the range from the volume setting value Vd to the maximum volume setting value (100 level) that is greater than the volume setting value Vd. In this case, the audio output processor 314 performs audio output processing so that the rate of change in the output volume value of the guidance audio with respect to the volume setting value (the slope of the solid line plot (waveform)) is a value that is substantially equal to the rate of change in the output volume value of the non-guidance audio with respect to the volume setting value (the slope of the broken line plot (waveform)) as the volume setting value changes, at a volume setting value greater than or equal to the volume setting value Vd. In other words, the rate of change in the output volume value of the guidance audio to the volume setting value is equal to the rate of change in the output volume value of the non-guidance audio to the volume setting value for a specific range of the volume setting value (i.e., for the range from the 0 level to the volume setting value Vc). On the other hand, the rate of change in the output volume value of the guidance audio to the volume setting value is less than the rate of change in the output volume value of the non-guidance audio to the volume setting value for a specific range of the volume setting value (i.e., for the range from the 0 level to the volume setting value Vd).

As discussed above, with the third embodiment, the output volume value of the guidance audio is constant over the range of volume setting values up to the volume setting value Vd (the slope of the solid line plot is approximately equal to zero), and varies at a constant rate that is substantially equal to that of the non-guidance audio over the range of volume setting values from the volume setting value Vc and beyond. The rest of the configuration of the third embodiment is the same as in the first embodiment above.

Effect of Third Embodiment

The following effect can be obtained with the third embodiment.

With the third embodiment, the audio output processor 314 is provided to set the output volume value of the guidance audio to be greater than the 0 level when the output volume value of the non-guidance audio is at the 0 level (a muted state), and to set the output volume value of the guidance audio to at least the output volume value of the non-guidance audio when the output volume value of the non-guidance audio is something other than the 0 level. Consequently, just as in the first embodiment above, even when the volume setting value of the display device 300 has been set to the 0 level (a muted state), a visually impaired user can be reliably apprised of the content of the guidance by means of the guidance audio at an output volume value that is greater than the 0 level.

Also, with the third embodiment, over the range of the volume setting values less than or equal to the volume setting value Vd, the output volume value of the guidance audio is set to fall within a specific range (a constant value). Consequently, unlike the situation when the output volume value of the guidance audio similarly drops as the volume setting value decreases, here, even if the volume setting value decreases, a visually impaired user can properly hear the guidance audio whose output volume value has been maintained within the specific range (constant value).

Also, with the third embodiment, the volume setting value Vd is a volume setting value at the midpoint (50 level) of the settable volume range (from the 0 level to the 100 level). Consequently, over the range of less than or equal to the midpoint (50 level) out of the settable volume range (from the 0 level to the 100 level), the output volume value of the guidance audio can be maintained within a specific range (constant value) even if the volume setting value is decreased. Thus, a visually impaired user can easily hear the guidance audio whose output volume value has been maintained within the specific range (constant value). Also, within a range in which the volume setting value is greater than the midpoint (from greater than the 50 level to the 100 level), the user can properly hear both the guidance audio and the non-guidance audio indicating audio related to video.

Also, with the third embodiment, over the range from the volume setting value Vd to the maximum volume setting value (100 level), the output volume value of the guidance audio and the output volume value of the non-guidance audio at the volume setting value Vd are substantially equal values. Consequently, over the range from the volume setting value Vd to the maximum volume setting value (100 level), the output volume value of the guidance audio is kept from going too high, while this guidance audio can be outputted at the proper output volume value. The rest of the effect of the third embodiment is the same as that of the first embodiment above.

Fourth Embodiment

Figure 5:
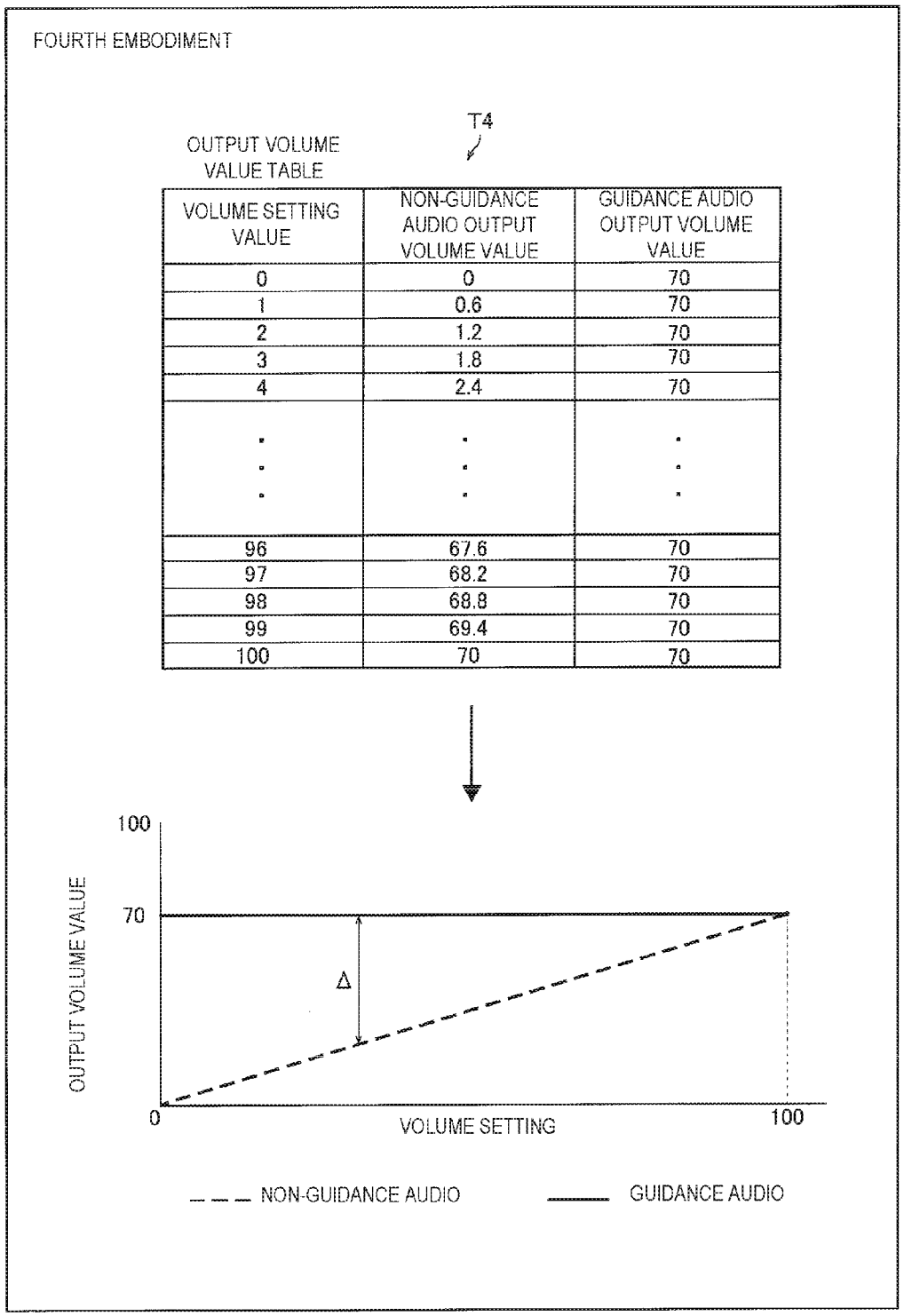
FIG. 5 is a table of correlation between a volume setting value and output volume values for guidance audio and non-guidance audio in a display device pertaining to a fourth embodiment.

The configuration of a display device 400 pertaining to the fourth embodiment will now be described through reference to FIGS. 1 and 5. In the first embodiment, the output volume value of the guidance audio is increased when the volume setting value is increased over the entire range over which the volume setting value can be varied. On the other hand, in this fourth embodiment, even if the volume setting value is increased, the guidance audio will be outputted at an output volume value W (constant value) that is greater than the 0 level. Except for a difference in the output volume value table, the device configuration in the fourth embodiment is substantially the same as the device configuration in the first embodiment above.

As shown in FIG. 1, an output volume value table T4 is stored in a memory area (storage component) 440 of an audio output processor 414. In the fourth embodiment, the audio output processor 414 performs control to output the guidance audio at an output volume value that is greater than the 0 level, based on the output volume value table T4. That is, as shown in FIG. 5, the audio output processor 414 performs audio output control using the output volume value table T4 set so that the output volume value of the guidance audio will not drop to the 0 level. The audio output processor 414 is an example of the "controller" of the present disclosure. The output volume value table T4 is an example of the "table" of the present disclosure.

In the fourth embodiment, the audio output processor 414 performs control to output the guidance audio at the constant output volume value W (such as the 70 level) when the volume setting value is increased over the entire range over which the volume setting value can be varied. In this case, the settable volume range of the setting component 51 of the remote control 50 (see FIG. 1) is set to a range in which the output volume value W of the guidance audio is greater than or equal to the output volume value of the non-guidance audio. Specifically, audio output control is performed so that over the range from the 0 level to the 100 level, the output volume value W of the guidance audio will always be greater than or equal to the output volume value of the non-guidance audio. Also, the audio output processor 414 performs audio output control so that when the volume setting value has reached the 100 level (maximum value), the output volume value of the non-guidance audio (the plot indicated by a broken line) is substantially equal to the output volume value W of the guidance audio (the plot indicated by a solid line).

As discussed above, in the fourth embodiment, control is performed so that the output volume value of the guidance audio will be the constant output volume value W (fixed value) over the entire range over which the volume setting value can be varied. The rest of the configuration in the fourth embodiment is the same as that in the first embodiment above.

Effect of Fourth Embodiment

The following effect can be obtained with the fourth embodiment.

With the fourth embodiment, the audio output processor 414 is provided to set the output volume value of the guidance audio to be greater than the 0 level when the output volume value of the non-guidance audio is at the 0 level (a muted state), and to set the output volume value of the guidance audio to at least the output volume value of the non-guidance audio when the output volume value of the non-guidance audio is something other than the 0 level. Consequently, just as in the first embodiment above, even when the volume setting value of the display device 400 has been set to the 0 level (a muted state), a visually impaired user can be reliably apprised of the content of the the guidance by means of the guidance audio at an output volume value that is greater than the 0 level.

Also, with the fourth embodiment, over the entire settable range of volume setting values, the output volume value W of the guidance audio is set to fall within a specific range (such as a constant value of "70 level"). Consequently, as long as the output volume value W of the guidance audio is set to the proper value in advance, a visually impaired user can hear the guidance audio at a uniform volume that allows the guidance to be clearly heard, no matter what the volume setting value is.

Also, with the fourth embodiment, the settable volume range of the setting component 51 of the remote control 50 can be set to a range in which the output volume value W of the guidance audio is greater than or equal to the output volume value of the non-guidance audio. Consequently, no matter what the volume setting value is within the settable volume range of the setting component 51, the output volume value W of the guidance audio can be set to be greater than or equal to the output volume value of the non-guidance audio. Thus, a visually impaired user can reliably hear the guidance audio while the non-guidance audio is being outputted. The rest of the effect of the fourth embodiment is the same as that of the first embodiment above.

First Modification Example of Fourth Embodiment

Figure 6:
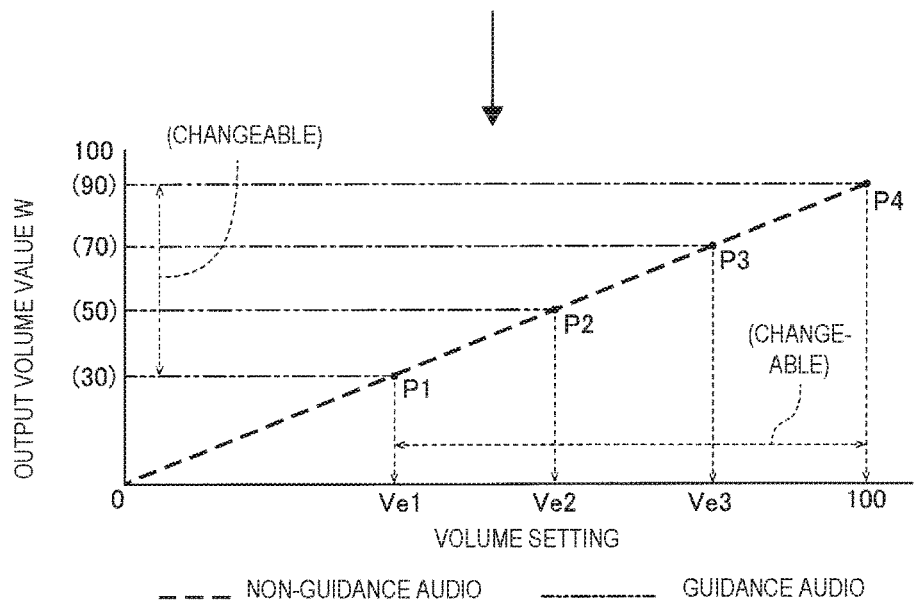
FIG. 6 is a table of correlation between a volume setting value and output volume values for guidance audio and non-guidance audio in a display device pertaining to a first modification example of the fourth embodiment.

The configuration of a display device 401 pertaining to a first modification example of the fourth embodiment will now be described through reference to FIGS. 1 and 6. In the fourth embodiment, the output volume value W of the guidance audio is fixed at a constant value (70 level). With this first modification example of the fourth embodiment, the configuration allows the output volume value W to be varied.

An output volume value table T4a is stored in the memory area 440 of the audio output processor 414 of the display device 401 (see FIG. 1). The audio output processor 414 performs control to output the guidance audio at an output volume value W that is greater than the 0 level, based on the output volume value table T4a. In this case, as shown in FIG. 6, the output volume value W written to the output volume value table T4a can be changed by the user to the desired values. For instance, if the output volume value W of the guidance audio has been set to the 30 level (the two-dot chain line plot), then the settable volume range of the setting component 51 of the remote control 50 (see FIG. 1) is changed to a range up to a volume setting value Ve1 corresponding to an intersection P1 with the output volume value of the non-guidance audio (the plot indicated by a broken line (fixed characteristics)) (from the 0 level to the Ve1 level). Similarly, if the output volume value W has been set to the 50 level, the 70 level, or the 90 level, then the settable volume range of the setting component 51 is changed to a range from the 0 level up to a volume setting value Ve2, Ve3, or the 100 level corresponding to intersections P2, P3, and P4 with the output volume value of the non-guidance audio. Thus, the settings are rewritten to the output volume value table T4a so that volume setting (horizontal axis of the graph in FIG. 6) is restricted to one of the ranges between the 0 level and the 100 level, over a range in which the output volume value of the non-guidance audio does not reach or exceed the output volume value W of the guidance audio, according to a change in the output volume value W of the guidance audio. The output volume value table T4a is an example of the "table" of the present disclosure. The rest of the configuration of the first modification example of the fourth embodiment is the same as that in the fourth embodiment above.

Effect of First Modification Example of Fourth Embodiment

With the first modification example of the fourth embodiment, the volume setting value (Ve) for the display device 401 can be adjusted to one of the ranges between the 0 level and the 100 level, over the range in which the output volume value of the non-guidance audio does not go over the output volume value W of the guidance audio, according to a change in the output volume value W of the guidance audio. Consequently, regardless of the volume of the guidance audio (the output volume value W), the output volume value of the non-guidance audio can be kept at or under the output volume value W of the guidance audio. Thus, a visually impaired user can easily hear the guidance audio no matter what the volume is. The rest of the effect of the first modification example of the fourth embodiment is the same as that of the first embodiment above.

Second Modification Example of Fourth Embodiment

Figure 7:
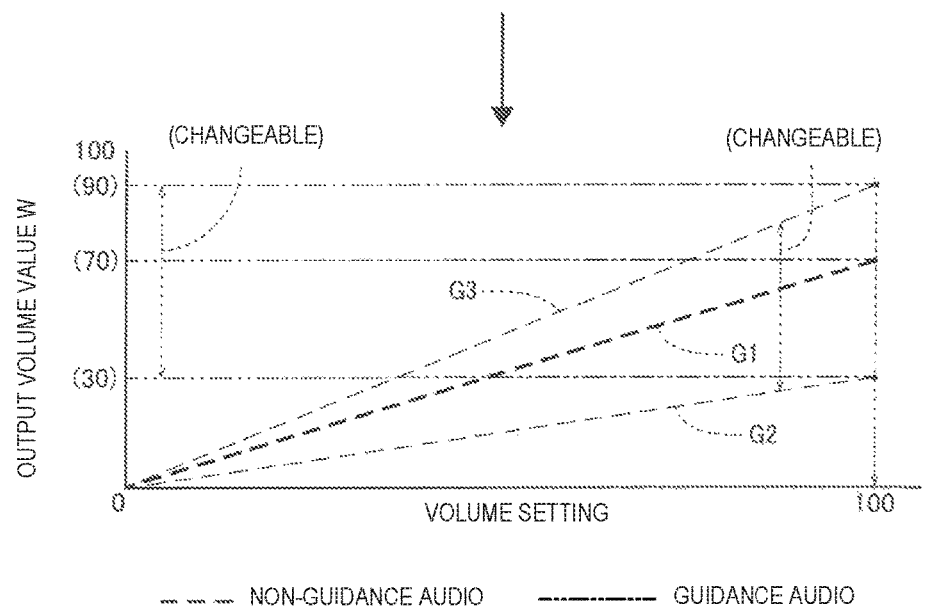
FIG. 7 is a table of correlation between a volume setting value and output volume values for guidance audio and non-guidance audio in a display device pertaining to a second modification example of the fourth embodiment.

The configuration of a display device 402 pertaining to a second modification example of the fourth embodiment will now be described through reference to FIGS. 1 and 7. In the first modification example of the fourth embodiment, the characteristics of the output volume value of the non-guidance audio are fixed regardless of the setting of the output volume value W of the guidance audio. With this second modification example of the fourth embodiment, the configuration allows the output volume value of the non-guidance audio to be varied according to the setting of the output volume value W of the guidance audio.

An output volume value table T4b is stored in the memory area 440 of the audio output processor 414 of the display device 402 (see FIG. 1). The audio output processor 414 performs control to output the guidance audio at an output volume value W that is greater than the 0 level, based on the output volume value table T4b. In this case, as shown in FIG. 7, the output volume values W written to the output volume value table T4b can be changed by the user to the desired values. The configuration is such that the characteristics of the output volume value of the non-guidance audio are also changed according to the setting (changed value) of the output volume value W of the guidance audio.

For instance, if the output volume value W of the guidance audio has been set to the 70 level (the two-dot chain line plot), then the settings in the output volume value table T4b are determined so that the output volume value of the non-guidance audio will have the characteristics G1. Also, the configuration is such that if the output volume value W is set to the 30 level (two-dot chain line plot) or the 90 level (two-dot chain line plot), the settings in the output volume value table T4b are rewritten so that the output volume value of the non-guidance audio will have the characteristics G2 or the characteristics G3. Furthermore, no matter what output volume value W the guidance audio is set to, the characteristics of the output volume value of the non-guidance audio will be changed, and the user will be permitted to adjust the volume setting value of the display device 402 up to the maximum level of 100 (from the 0 level to the 100 level). Thus, even if the output volume value W of the guidance audio is changed, the characteristics (such as G1 to G3) of the output volume value of the non-guidance audio will be changed according to the change of the output volume value W of the guidance audio, and the setting will be rewritten in the output volume value table T4b so that the maximum volume setting value (the horizontal axis in the graph in FIG. 7) is permitted up to the 100 level. The output volume value table T4b is also an example of the "table" of the present disclosure. The rest of the configuration of the second modification example of the fourth embodiment is the same as that of the fourth embodiment above.

Effect of Second Modification Example of Fourth Embodiment

With the second modification example of the fourth embodiment, the characteristics (such as G1 to G3) of the output volume value of the non-guidance audio are changed according to a change in the output volume value W of the guidance audio. The maximum volume setting value is always permitted up to the 100 level. Consequently, regardless of the volume (the output volume value W) of the guidance audio, the user can set the volume of the display device 402 between the 0 level and the 100 level (the maximum setting value). Specifically, no matter what the output volume value W (constant value) of the guidance audio is, the user can set the display device 402 to a comfortable volume by effectively using the widest volume setting range (from the 0 level to the 100 level). The rest of the effect of the second modification example of the fourth embodiment is the same as that of the first embodiment above.

Fifth Embodiment

The configuration of a display device 500 pertaining to the fifth embodiment will now be described through reference to FIGS. 1 to 5. In the first embodiment, audio output processing is performed using a single output volume value table in which output volume values for the non-guidance audio and output volume values for the guidance audio are associated with volume setting values. With this fifth embodiment, a plurality of output volume value tables are stored. The audio output processing is performed using the most suitable output volume value table according to the guidance content. Except for a difference in the number of output volume value tables stored in the memory area 540, the device configuration in the fifth embodiment is substantially the same as the device configuration in the first embodiment above.

With the fifth embodiment, a plurality of (four in this embodiment) different output volume value tables are stored in the memory area (storage component) 540 of the audio output processor 514 (see FIG. 1), for example. More precisely, the memory area (storage component) 540 stores the output volume value table T1 (see FIG. 2) as a first table, and the output volume value table T2 (see FIG. 3) as a second table. In the output volume value table T2, output volume values different from the output volume values of the guidance audio in the output volume value table T1 are associated as the output volume values for the guidance audio with volume setting values. The memory area (storage component) 540 further stores the output volume value table T3 (see FIG. 4), which is different from the output volume value tables T1 and T2, and the output volume value table T4 (see FIG. 5), which is different from the output volume value tables T1 to T3. Of course, different number of output volume value tables can be stored in the memory area 540.

The audio output processor 514 switches between the output volume value tables T1 to T4 according to the guidance content (performs control based on one of the output volume value tables), and thereby making the output volume value of the non-guidance audio different from the output volume value of the guidance audio. The audio output processor 514 is an example of the "controller" of the present disclosure.

For example, when giving a notification without which the convenience of a visually impaired user would be compromised (when outputting information related to channel changing as the guidance information, for example), the audio output processor 514 selects from among the output volume value tables T1 to T4 the output volume value table with which the guidance audio can be outputted at the highest volume at the current volume setting value, and performs control processing based on the selected output volume value table.

Also, for example, when giving a notification without which the convenience of a visually impaired user would not be compromised (a notification whose omission would pose no special inconvenience to a visually impaired user), the audio output processor 514 selects from among the output volume value tables T1 to T4 one output volume value table with which the guidance audio can be outputted at the second-highest volume at the current volume setting value, and performs control processing based on the selected output volume value table. The rest of the configuration of the fifth embodiment is the same as in the first embodiment above.

Effect of Fifth Embodiment

The following effect can be obtained with the fifth embodiment.

With the fifth embodiment, the audio output processor 514 is provided to set the output volume value of the guidance audio to be greater than the 0 level when the output volume value of the non-guidance audio is at the 0 level (a muted state), and to set the output volume value of the guidance audio to at least the output volume value of the non-guidance audio when the output volume value of the non-guidance audio is something other than the 0 level. Consequently, just as in the first embodiment above, even when the volume setting value of the display device 500 has been set to the 0 level (a muted state), a visually impaired user can be reliably apprised of the content of the guidance by means of the guidance audio at an output volume value that is greater than the 0 level.

Also, with the fifth embodiment, the audio output processor 514 performs control over the output volume value of the guidance audio by switching between the output volume value tables T1 to T4 according to the content of the guidance. Consequently, the output volume value of the guidance audio can be set to a more suitable output volume value according to the content of the guidance audio by switching between the output volume value tables T1 to T4. For example, even when giving a notification without which the convenience of a visually impaired user would be compromised (when outputting information related to channel changing as the guidance information, for example), the guidance audio can be reliably conveyed. The rest of the effect of the fifth embodiment is the same as in the first embodiment above.

Modification Examples

The embodiments disclosed herein are illustrative in all respects, and should not be construed as being limiting in nature. The scope of the invention being indicated by the appended claims rather than by the above description of embodiments, all modifications (modification examples) within the meaning and range of equivalency of the claims are included.

For instance, in the first to fifth embodiments above, the display devices 100 to 500 are all television sets, but the present invention is not limited to this. The display devices 100 to 500 can instead be something other than a television set, such as a tablet or personal computer.

Also, in the first to fifth embodiments above, an example is given of performing audio output processing using the output volume value tables T1 to T4, but the present invention is not limited to this. With the present invention, audio output processing can be performed without providing an output volume value table. For example, audio output processing can be performed by calculation using correlation (graph or function) illustrated in FIGS. 2 to 7.

Also, in the first to fifth embodiments above, the setting component 51 of the remote control 50 is used to make changes to the volume setting value on the display devices 100 to 500, but the present invention is not limited to this. With the present invention, changes to the volume setting value can be made via a setting component provided to the main body (the housing) of the display devices 100 to 500.

Also, in the fifth embodiment above, the four output volume value tables T1 to T4 are stored, but the present invention is not limited to this. With the present invention, a plurality of output volume values tables can be stored in some number other than four.

Also, in the first to third and fifth embodiments above, the output volume of the guidance audio corresponding to at least a partial range of the volume setting values varied linearly, but the present invention is not limited to this. With the present invention, the output volume of the guidance audio can be varied non-linearly.

Figure 8:
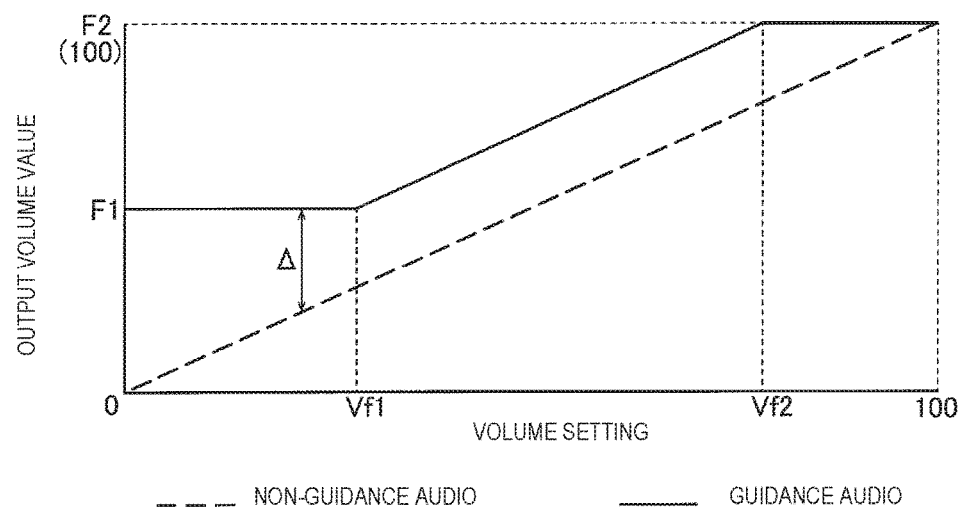
FIG. 8 is a graph visually depicting correlation (table) between a volume setting value and output volume values for guidance audio and non-guidance audio in a display device pertaining to a modification example.

Also, in the first to fourth embodiments above, control is performed using the various output volume value tables T1 to T4, and in the fifth embodiment above, control is performed by selecting one of the output volume value tables T1 to T4, but the present invention is not limited to this. With the present invention, some other output volume value table besides the output volume value tables T1 to T4 can be used. For instance, an output volume value table in which there are portions at two locations where the output volume value is constant, as in the modification example of the present invention shown in FIG. 8. In this case, a constant output volume value F1 is used in a range in which the volume setting value is less than a specific volume setting value Vf1 (a range from the 0 level to Vf1), while a constant output volume value F2 is used in a range in which the volume setting value is greater than a specific volume setting value Vf2 (a range from Vf2 to the maximum value). Also, there is a linear change in volume setting values in between these (a range from Vf1 to less than Vf2).

Also, in the first to fifth embodiments above, the "output volume value" outputted from the output component 4 is directly ascertained as the volume adjustment amount in a range from the 0 level (0%) to the 100 level (100%), and the output volume value tables T1 to T4 are provided for setting these volumes, but the present invention is not limited to this. As to how the "output volume value" defined by the output volume value tables T1 to T4 is viewed, the product of multiplying the "input audio data" inputted from outside to the display device 100 by a specific amplification ratio A with the amplifier 3 is further multiplied by the above-mentioned audio adjustment amount (0% to 100%) to give an "output volume value." With this configuration, the the display device can also be configured such that when the volume setting is set such that the volume of the "second signal" of the present invention is a first volume that is lower than a specific volume, the volume of the "first audio" will be greater than this first volume. Also, as another configuration example, the present invention can also be applied to a configuration in which the "output volume value" outputted from the output component 4 is obtained by multiplying a volume adjustment amplification ratio B (a numerical value in the range of $-\infty$ to $+\alpha$) by the "input audio data" inputted from the outside.

Also, in the first to fifth embodiments above, an example of the guidance audio includes the information related to operations performed on the display device 100 using the remote control 50 or the information related to the status of the display device 100, but the present invention is not limited to this. The "first audio" in the present invention can be something such as "the volume is xxx" or "the volume is set to the maximum (minimum)" when the user changes the volume from the speaker 9. Also, the "first audio" in the present invention can be something such as "channel xxx" when the user changes the channel number. In this case, the channel number can be pronounced, or the broadcast station acquired from an EPG via the receiver 6 can be pronounced. Also, the "first audio" in the present invention can be something such as "HDMI™ xxx (number)" or "video input" when the external input to the display device 100 is switched. Furthermore, a case in which menu selection is performed is assumed as part of the operations performed by the user on the display device 100. In this case, the audio content can be something such as "screen setting menu" or "audio setting menu", to let the user know the menu category that is currently selected with the cursor on the menu screen. All of these are encompassed by the guidance audio.

Also, in the first to fifth embodiments above, the output volume value of the guidance audio is usually set to be greater than the 0 level when the output volume value of the non-guidance audio is at the 0 level, and the output volume value of the guidance audio is set to be greater than or equal to the output volume value of the non-guidance audio when the output volume value of the non-guidance audio is something other than the 0 level, but the present invention is not limited to this. For example, depending on the user's preference, the display devices 100 to 500 can be configured to allow the user to temporarily change the setting of audio output processing so that the characteristics of the output volume value of the guidance audio and the characteristics of the output volume value of the non-guidance audio will be reversed (inverted) from what is given above. The configuration can also be such that it is possible to return to the original settings when a visually impaired user uses the display devices 100 to 500.

[1] In view of the state of the known technology and in accordance with a first aspect of the present invention, a display device comprises a display component, an output component, a setting component, and a controller. The output component is configured to output a first signal having guidance information and a second signal having audio information pertaining to content. The setting component is configured to perform volume setting. The controller is configured to control output levels of the first signal and the second signal. The controller is configured to set the output level of the first signal to a value that is greater than or equal to the output level of the second signal, and configured to set the output level of the first signal to a value greater than zero when the output level of the second signal is zero.

With the display device, as discussed above, the controller is provided so that the output level of the first signal having the guidance information is set to a value that is greater than or equal to the output level of the second signal having the audio information related to video or other content, and the output level of the first signal is set to a value greater than zero when the output level of the second signal is zero. Consequently, the first signal having the guidance information with a volume greater than 0 (zero) can be outputted even when a volume setting value of the display device has been set to 0 (zero). Also, the output level of the first signal is a value that is greater than or equal to the output level of the second signal even when the output level of the second signal is some value other than zero. Thus, the first signal can be outputted in addition to the second signal. As a result, even when the volume setting value of the display device has been set to 0 (zero; a muted state), a visually impaired user can be reliably apprised of the content of the guidance information by means of the first signal having the guidance information.

[2] In accordance with a preferred embodiment according to the display device mentioned above, a change amount in the output level of the first signal due to a specific change in a volume setting value is a value less than or equal to a change amount in the output level of the second signal due to the specific change in the volume setting value. With this configuration, the increase (or decrease) in the output level of the first signal due to the increase (or decrease) in the volume setting value can be kept lower than the increase (or decrease) in the output level of the second signal due to the increase (or decrease) in the volume setting value. Thus, a sudden change in the output level of the first signal due to the increase (or decrease) in the volume setting value is avoided. Therefore, a visually impaired user will be able to hear the guidance information (the first signal) to the extent that simultaneously hearing the audio information related to video (the second signal) will not be hindered.

[3] In accordance with a preferred embodiment according to any one of the display devices mentioned above, a change rate in the output level of the first signal relative to a volume setting value is less than or equal to a change rate in the output level of the second signal relative to the volume setting value. For example, slopes a and b of waveforms of the first signal and the second signal are in a relation of a≤b. With this configuration, the slope a≤ the slope b. Here, the waveform are indicative of characteristics of the output levels of the first signal and the second signal and a volume setting value. Thus, the increase (or decrease) in the output level of the first signal due to the increase (or decrease) in the volume setting value can be reliably kept lower than the increase (or decrease) in the output level of the second signal due to the increase (or decrease) in the volume setting value. Therefore, regardless of the increase (or decrease) in the volume setting value, a visually impaired user will reliably be able to hear the guidance information (the first signal) to the extent that hearing the audio information related to video (the second signal) will not be hindered.

[4] In accordance with a preferred embodiment according to any one of the display devices mentioned above, the change rate in the output level of the first signal relative to the volume setting value is equal to the change rate in the output level of the second signal relative to the volume setting value for a specific range of the volume setting value.

[5] In accordance with a preferred embodiment according to any one of the display devices mentioned above, difference between the output level of the first signal and the output level of the second signal at a specific volume setting value is greater than difference between the output level of the first signal and the output level of the second signal at a volume setting value that is greater than the specific volume setting value. With this configuration, as the volume setting value increases, the difference between the output level of the first signal and the output level of the second signal shrinks. Thus, it is less likely that the value of the output level of the guidance information (the first signal) will be too high. Also, the guidance information can be outputted at a value of an output level that is suitable for a visually impaired user.

[6] In accordance with a preferred embodiment according to any one of the display devices mentioned above, difference between the output level of the first signal and the output level of the second signal at a specific volume setting value and difference between the output level of the first signal and the output level of the second signal at a volume setting value that is different from the specific volume setting value are substantially equal values over a range from a first volume setting value to a second volume setting value that is greater than the first volume setting value. With this configuration, even if the volume setting value is changed, the first signal can be outputted at a value of an output level that is greater than the value of the output level of the second signal by a specific amount of volume (a volume of a constant value). Therefore, a visually impaired user can easily hear the first signal even if the volume setting value has been changed.

[7] In accordance with a preferred embodiment according to any one of the display devices mentioned above, with a configuration in which the difference between the output level of the first signal and the output level of the second signal at the specific volume setting value and the difference between the output level of the first signal and the output level of the second signal at the volume setting value that is different from this specific volume setting value are substantially equal values, the output level of the first signal is a value that falls within a specific range over a range of volume setting values that are greater than the second volume setting value. With this configuration, even if the output level of the first signal is set to a volume setting value that is greater than the second volume setting value, the output level of the first signal is maintained at the maximum value or near the maximum value (within a specific range). Thus, over a range of volume setting values that are greater than or equal to a volume setting value at which the output level of the first signal is at its highest, a situation will be avoided in which the first signal having the guidance information becomes a hindrance that makes it hard to hear the second signal indicating the audio information related to video.

[8] In accordance with a preferred embodiment according to any one of the display devices mentioned above, with a configuration in which the difference between the output level of the first signal and the output level of the second signal at the specific volume setting value and the difference between the output level of the first signal and the output level of the second signal at the volume setting value that is different from the specific volume setting value are substantially equal values, the output level of the first signal is a value that falls within a specific range over a range of volume setting values that are less than or equal to the first volume setting value. With this configuration, as opposed to a situation in which the output level of the first signal goes down as the volume setting value decreases, a visually impaired user will be able to properly hear the first signal whose output level is maintained within the specific range, even if the volume setting value decreases.

[9] In accordance with a preferred embodiment according to any one of the display devices mentioned above, the first volume setting value is a volume setting value at a midpoint in a settable volume range. With this configuration, the output level of the first signal can be maintained within a specific range even if the volume setting value decreases in a range at or below the midpoint of the settable volume range. Thus, a visually impaired user will be able to easily hear the first signal whose output level is maintained within the specific range. Also, over a range in which the volume setting value is above the midpoint, the user can properly hear both the first signal having the guidance information and the second signal having the audio information related to video.

[10] In accordance with a preferred embodiment according to any one of the display devices mentioned above, with a configuration in which the difference between the output level of the first signal and the output level of the second signal at the specific volume setting value and the difference between the output level of the first signal and the output level of the second signal at the volume setting value that is different from the specific volume setting value are substantially equal values, the output level of the first signal and the output level of the second signal are substantially equal values at the specific volume setting value over the range from the first volume setting value to the second volume setting value. With this configuration, over the range from the first volume setting value to the second volume setting value, the value of the output level of the first signal having the guidance information is kept from going too high, while this first signal can be outputted at a proper value of an output level.

[11] In accordance with a preferred embodiment according to any one of the display devices mentioned above, with a configuration in which the difference between the output level of the first signal and the output level of the second signal at the specific volume setting value and the difference between the output level of the first signal and the output level of the second signal at the volume setting value that is different from the specific volume setting value are substantially equal values, the output level of the first signal and the output level of the second signal are different values at the specific volume setting value over the range from the first volume setting value to the second volume setting value. With this configuration, even if the volume setting value is changed, the first signal can be outputted at a value of an output level that is greater than the value of the output level of the second signal by a specific output level (volume). Thus, a visually impaired user can easily hear the first signal.

[12] In accordance with a preferred embodiment according to any one of the display devices mentioned above, the output level of the first signal is a value that falls within a specific range. With this configuration, if the output level of the first signal is set to a proper value, then no matter what the volume setting value is, a visually impaired user can hear the first signal having the guidance information at a uniform volume that is easy to hear.

[13] In accordance with a preferred embodiment according to any one of the display devices mentioned above, a settable volume range of the setting component is set to a range in which the output level of the first signal is greater than or equal to the output level of the second signal. With this configuration, no matter what the volume setting value is within the settable volume range of the setting component, the value of the output level of the first signal can be set to be greater than or equal to the value of the output level of the second signal. Thus, a visually impaired user can reliably hear the first signal having the guidance information while the second signal having the audio information related to video is being outputted.

[14] In accordance with a preferred embodiment according to any one of the display devices mentioned above, the display device further comprises a table in which the output levels of the first signal and the second signal are respectively associated with volume setting values corresponding to the volume setting by the setting component. The controller is configured to control the output levels of the first signal and the second signal based on the table. With this configuration, even if the output level of the second signal in the display device is set to 0 (zero), as opposed to a situation in which computation is performed each time so that the output level of the first signal will not be 0 (zero), by using the table, it can be quickly prevented that the output level of the first signal will be 0 (zero), and computation will impose an extra load on the controller. Also, even if the output level of the second signal in the display device is set to something other than 0 (zero), the table can be used to quickly keep the output level of the first signal at or above the output level of the second signal.

[15] In accordance with a preferred embodiment according to any one of the display devices mentioned above, the table includes a first table in which specific output levels of the first signal are associated with volume setting values, and a second table in which output levels different from the specific output levels of the first signal are associated with the volume setting values. The controller is configured to control the output level of the first signal based on either the first table or the second table. With this configuration, the output level of the first signal can be set to a more suitable output level (output volume value) according to the content of the first signal by suitably switching between the first table and second table. For instance, even when giving a notification without which the convenience of a visually impaired user would be compromised (when outputting information related to channel changing as the guidance information), the guidance information (first signal) can be reliably conveyed.

[16] In accordance with a preferred embodiment according to any one of the display devices mentioned above, the controller is configured to perform control to change both the output levels of the first signal and the second signal along with a change in a volume setting value. With this configuration, the first signal and second signal can both be changed to the values of the output levels that are suited to the usage situation, in conjunction with the volume setting value.

[17] In accordance with a preferred embodiment according to any one of the display devices mentioned above, the first signal is audio that conveys at least one of information related to an operation carried out on the display device, and information related to status of the display device. With this configuration, the information related to the operations performed on the display device, and the information related to the status of the display device can be conveyed to a visually impaired user.

[18] In accordance with a preferred embodiment according to any one of the display devices mentioned above, the second signal is audio related to video displayed on the display component. With this configuration, the first signal can be outputted even with a setting such that audio related to video displayed on the display component is at a first volume (not outputted).

[19] In accordance with a preferred embodiment according to any one of the display devices mentioned above, the display device further comprises a receiver configured to receive broadcast signals. The second signal corresponds to audio from the receiver. With this configuration, the first signal can be easily outputted so that the user can see and hear it, even when the volume setting value at which the second signal included in the broadcast signal is outputted has been set to a first volume.

[20] In accordance with a preferred embodiment according to any one of the display devices mentioned above, the display device further comprises an input unit to which audio from an external device is inputted. The second signal corresponds to the audio inputted to the input unit. With this configuration, the first signal can be easily outputted so that the user can see and hear it, even when the volume setting value at which the second signal included in content is outputted form the external device has been set to a first volume.

With the present invention, as discussed above, even when the volume setting value of the display device has been set to 0 (zero; a muted state), the contents of the guidance information can be reliably conveyed to a visually impaired user.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A display device comprising:
a display component;
a speaker that outputs a first signal having guidance information pertaining to a user operation performed relative to the display device or a status of the display device and a second signal having audio information pertaining to content, the speaker outputting the first signal in response to the user operation;
a receiver that receives volume setting that sets a volume setting value of the display device;
a controller that sets output levels of the first signal and the second signal to values corresponding to the volume setting value that has been set by the volume setting, respectively, the controller setting the output level of the first signal to a value that is greater than or equal to the output level of the second signal, and setting the output level of the first signal to a value greater than zero while the output level of the second signal is zero; and
a table in which the output levels of the first signal and the second signal are respectively associated with the volume setting value such that difference between the output level of the first signal and the output level of the second signal at a specific volume setting value being greater than difference between the output level of the first signal and the output level of the second signal at a volume setting value that is greater than the specific volume setting value,
the controller automatically setting the output levels of the first signal and the second signal based on the table such that difference between the output level of the first signal and the output level of the second signal decreases as the volume setting value that has been set by volume setting increases.
2. The display device according to claim 1, wherein
a change amount in the output level of the first signal due to a specific change in the volume setting value is a value less than or equal to a change amount in the output level of the second signal due to the specific change in the volume setting value.

3. The display device according to claim 1, wherein
a change rate in the output level of the first signal relative to the volume setting value is less than or equal to a change rate in the output level of the second signal relative to the volume setting value.

4. The display device according to claim 3, wherein
the change rate in the output level of the first signal relative to the volume setting value is equal to the change rate in the output level of the second signal relative to the volume setting value for a specific range of the volume setting value.

5. The display device according to claim 1, wherein
the output level of the first signal is a value that falls within a specific range.

6. The display device according to claim 5, wherein
a settable volume range of the volume setting is set to a range in which the output level of the first signal is greater than or equal to the output level of the second signal.

7. The display device according to claim 1, wherein
the table includes a first table in which specific output levels of the first signal are associated with the volume setting value, and a second table in which output levels different from the specific output levels of the first signal are associated with the volume setting value, and
the controller controls the output level of the first signal based on either the first table or the second table.

8. The display device according to claim 1, wherein
the controller performs control to change both the output levels of the first signal and the second signal along with a change in the volume setting value.

9. The display device according to claim 1, wherein
the first signal is audio that conveys at least one of information related to an operation carried out on the display device, and information related to status of the display device.

10. The display device according to claim 1, wherein
the second signal is audio related to video displayed on the display component.

11. The display device according to claim 1, further comprising
a receiver that receives broadcast signals,
the second signal corresponding to audio from the receiver.

12. The display device according to claim 1, further comprising
an input unit to which audio from an external device is inputted,
the second signal corresponding to the audio inputted to the input unit.

13. A display device comprising:
a display component;
a speaker that outputs a first signal having guidance information pertaining to a user operation performed relative to the display device or a status of the display device and a second signal having audio information pertaining to content, the speaker outputting the first signal in response to the user operation;
a receiver that receives volume setting that sets a volume setting value of the display device;
a controller that sets output levels of the first signal and the second signal to values corresponding to the volume setting value that has been set by the volume setting, respectively, the controller setting the output level of the first signal to a value that is greater than or equal to the output level of the second signal, and setting the output level of the first signal to a value greater than zero while the output level of the second signal is zero; and
a table in which the output levels of the first signal and the second signal are respectively associated with the volume setting value such that difference between the output level of the first signal and the output level of the second signal at a specific volume setting value and difference between the output level of the first signal and the output level of the second signal at a volume setting value that is different from the specific volume setting value being substantially equal values over a predetermined range from a first volume setting value to a second volume setting value that is greater than the first volume setting value, and such that a change amount in the output level of the first signal due to a specific change in the volume setting value outside the predetermined range being a value less than or equal to a change amount in the output level of the second signal due to the specific change in the volume setting value outside the predetermined range,
the controller automatically setting the output levels of the first signal and the second signal based on the table such that difference between the output level of the first signal and the output level of the second signal decreases as the volume setting value that has been set by volume setting increases outside the predetermined range.

14. The display device according to claim 13, wherein
the output level of the first signal is a value that falls within a specific range over a range of volume setting values that are greater than the second volume setting value.

15. The display device according to claim 13, wherein
the output level of the first signal is a value that falls within a specific range over a range of volume setting values that are less than or equal to the first volume setting value.

16. The display device according to claim 15, wherein
the first volume setting value is a volume setting value at a midpoint in a settable volume range.

17. The display device according to claim 13, wherein
the output level of the first signal and the output level of the second signal are substantially equal values at the specific volume setting value over the predetermined range from the first volume setting value to the second volume setting value.

18. The display device according to claim 13, wherein
the output level of the first signal and the output level of the second signal are different values at the specific volume setting value over the predetermined range from the first volume setting value to the second volume setting value.

* * * * *